Nov. 16, 1937.  O. K. NELSON  2,099,617
FLUID CURRENT MOTOR
Original Filed April 17, 1935   2 Sheets-Sheet 1

Inventor:
O. K. Nelson.
By H. S. Woodward,
Attorney

Nov. 16, 1937.  O. K. NELSON  2,099,617
FLUID CURRENT MOTOR
Original Filed April 17, 1935   2 Sheets—Sheet 2

Inventor:
O. K. Nelson,
By H. S. Woodward,
Attorney

Patented Nov. 16, 1937

2,099,617

UNITED STATES PATENT OFFICE 2,099,617

FLUID CURRENT MOTOR

Orvis K. Nelson, Pawhuska, Okla.

Refiled for abandoned application Serial No. 16,883, April 17, 1935. This application September 21, 1936, Serial No. 101,839

6 Claims. (Cl. 170—27)

This application is a refile of abandoned application Ser. No. 16,883, filed April 17, 1935.

The invention relates to fluid current motors, and particularly wind power devices adapted for operating pumps and farm machinery of various kinds, operation of sawmills, electric current generators, and other equipment.

It has for an object to effect improvement in the construction of the vane elements for such motors, and the control thereof automatically, particularly means for insuring proper operation of feathering vanes, and safeguarding them against damage by gales, or tornadoes, or hurricanes.

The invention includes particularly a novel stop and release device for controlling the action of vanes feathered by wind action and for causing their release when excessive wind pressures develop, and it is an advantage of my invention that the device is so designed as to be readily manufactured at low cost, may be installed and manually controlled by inexperienced persons to determine the direction of the operation of the device and also to place it at will in inoperative condition. The apparatus is also very durable and liable in a minimum degree to derangement incident to common use, and operates easily and efficiently with a minimum of wear.

Additional objects, advantages and features of invention reside in the construction and arrangement and combination of parts involved in the embodiment of the invention, as may be understood or will appear from the following description and accompanying drawings, wherein, Figure 1 is an elevation of a motor constructed in accordance with my invention, in operation.

Figure 1:
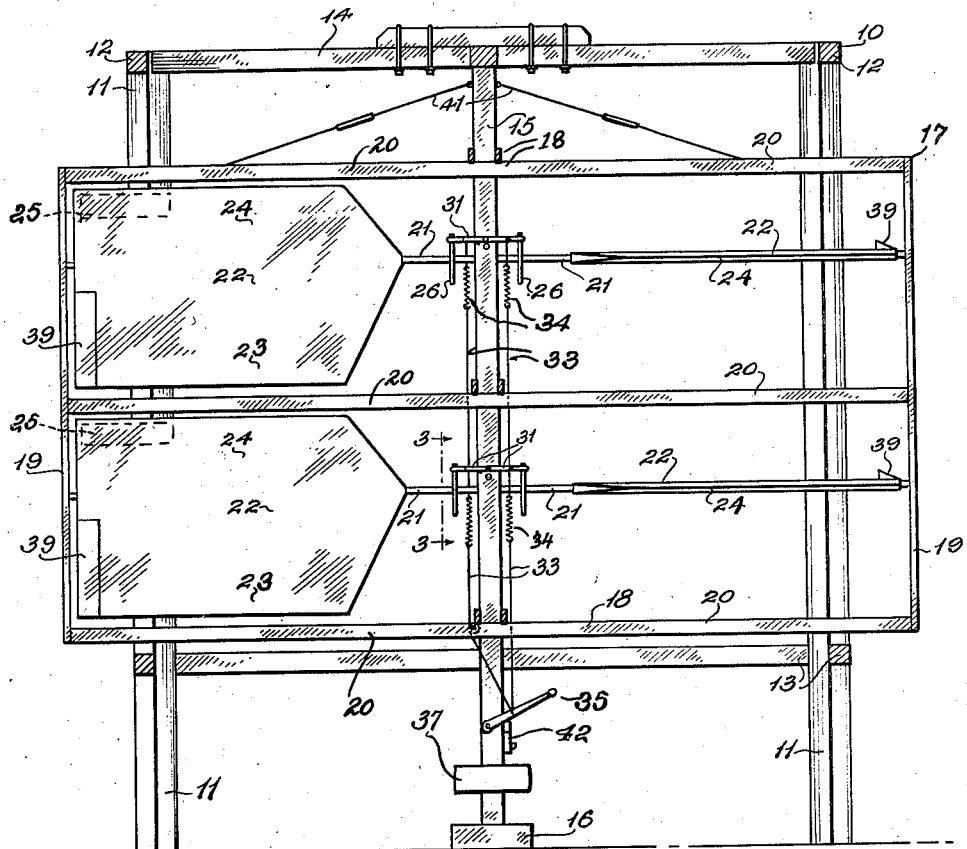
Figure 3:
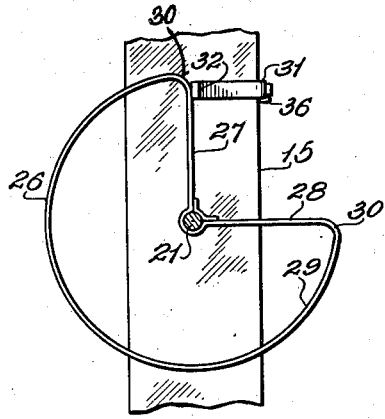
Figure 3 is a detail of the stop spring in position for operation in one direction, being a fragmentary section on the line 3—3 of Figure 1.

There is illustrated a suitable rigid frame 10, including four corner uprights 11 connected by horizontal top bars 12 and lower or bottom bars 13, which, however, are preferably spaced above the ground, more or less. The uprights are embedded in the ground and suitably anchored to support the frame with safety in violent winds. Two diagonals 14 are extended between the uprights at their upper ends.

At the intersection of the diagonals a vertical main shaft 15 is revolubly mounted, having a suitable bearing block 16 at its lower end, this block being set in the ground in the present instance to avoid need for braces from the frame 10. This shaft has customarily been a square timber of wood. On it there are mounted two wing or vane frames 17, fixed to the shaft so as to rotate therewith and adapted to carry vanes by which the shaft is rotated. The whole structure on this shaft may be called the rotor. In the present instance each frame is constructed with three horizontal cross members 18 vertically alined, secured at their middle parts to the shaft 15 one above the other, spaced sufficiently to accommodate rotatably vanes therebetween, and connected at their extremities by two vertical end members 19. The two frames are in vertical planes at right angles to each other. The number of these frames may be varied if desired, and the angular relation and number of the several vertical planes in which they are disposed may also be varied as discretion dictates.

Each horizontal member 18 consists of two relatively thin bars secured to opposite faces of the shaft 15 in horizontal alinement. Their ends converge and are fixed together on the end pieces 19 to form two arms 20 on each horizontal member. A truss function is thus secured in each arm by which it is adapted to sustain, with a minimum of yielding, horizontal stresses at right angles to the arm. The bars of the cross members of one frame are above or below those of the next adjacent cross members of the other frame, so that such cross member is continuous and each arm is integral with the diametrically opposite arm.

Between each two vertically spaced arms 20, therefore, there is formed an opening which is utilized for a respective vane, each frame having four such openings. A distance above the horizontal medial lines of the openings between the arms 20, there are mounted respective horizontal rock shafts 21, on which there are fixed respective wings or vanes 22 which stop short of the shaft 15. The shafts 21 have bearings in the main shaft 15 at their inner ends, and at their outer ends are pivoted in the end members 19. Each vane includes a wide portion 23 and a narrow portion 24 of such proportions that the full width of the vane is slightly less than the vertical dimension of the respective opening between the arms 20. A weight 25 is provided on the narrow portion of each vane to balance the vane for ready turning on its pivot. The vanes in the present instance are thus eight in number and each is independently movable. Each of the eight rock shafts 21 is provided with a stop and release spring 26, fixed on the shaft 21 a distance from the main shaft 15. Each of these devices 26 consists of two resilient arms 27 and 28 secured to the shaft 21 at right angles to each other and in a plane at right angles to the shaft 21, one being in a plane with the adjacent vane on the same shaft and projected at the same side with the narrow portion 24, while the other arm is at right angles to the plane of the vane in the direction of what may be termed the incident side of the vane. The extremities of the arms 27—28 are connected integrally by a guard sector bar 29 formed integrally with the arms and extending concentrically with the shaft 21 over an arc of 270 degrees. For convenience, the arms 27—28 and sector are formed of resilient wire of adequate strength, and the junctions of the arms and the sector are rounded as at 30, for purposes to be explained. For each stop device 26 a stop lever 31 of the first order is pivoted on the side of the shaft 15 to oscillate in a plane parallel to that of the respective frame 17. It has a long arm extended toward the vane and provided with an offset stop 32 spaced normally above the shaft 21 slightly less than the radius of the arms 27—28 and sector 29 and projected across the plane of the spring 26. The arm 27 engages the stop 32 at the side of the stop opposite the incident face of the vane by clockwise movement of the vane as viewed from its outer end. The vane is then in a vertical plane. The arm 28 engages the opposite side of the same stop 32 when the vane has been rotated counter-clockwise through an arc of 90 degrees from its vertical plane, as viewed from the outer end of the vane. The short arm of the lever has connected to its extremity a cable 33 by means of a helical spring 34, the cables from all the levers being commonly connected to a release lever 35 pivoted on the lower end of the main shaft 15. Downward movement of this lever manually will draw downward on all of the short arms of the levers 31 and lift the stops 32 out of the paths of the respective arms 27—28. The longer arms of the levers 31 are here indicated as being returned to operative position by gravity when the lever 35 is released. The long arms are stopped at operative position by means of pins 36 set in the sides of the shaft 15.

A power take-off pulley 37 is fixed on the shaft 15 at a suitable height, from which a belt 38 may be extended, as desired, or other suitable power take-off may be employed.

On each vane at the outer end of the wide portion 23 an auxiliary surface or feather piece 39 is fixed, consisting of a thin aluminum or other plate extending transversely along the end edge of the vane at right angles to its medial axis, and inclined inwardly from this transverse edge over the vane a short distance so that a surface is presented incident to the wind at the outer end of the vane. Stays 40 may be employed between the arms 20 to hold them against displacement from proper angular relation, and stays 41 may also be employed from the shaft 15 to the outer parts of the frames 17 to sustain them effectively against sagging.

Figure 2:
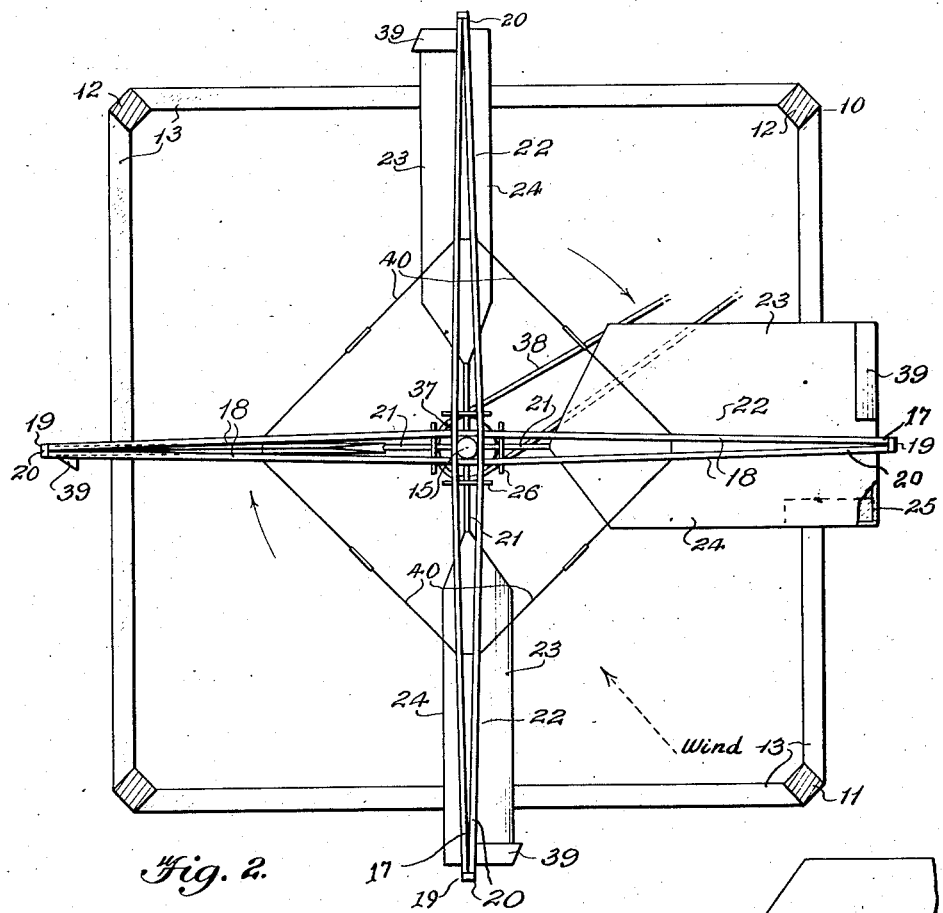
Figure 2 is a top view of Figure 1.
Figure 5:
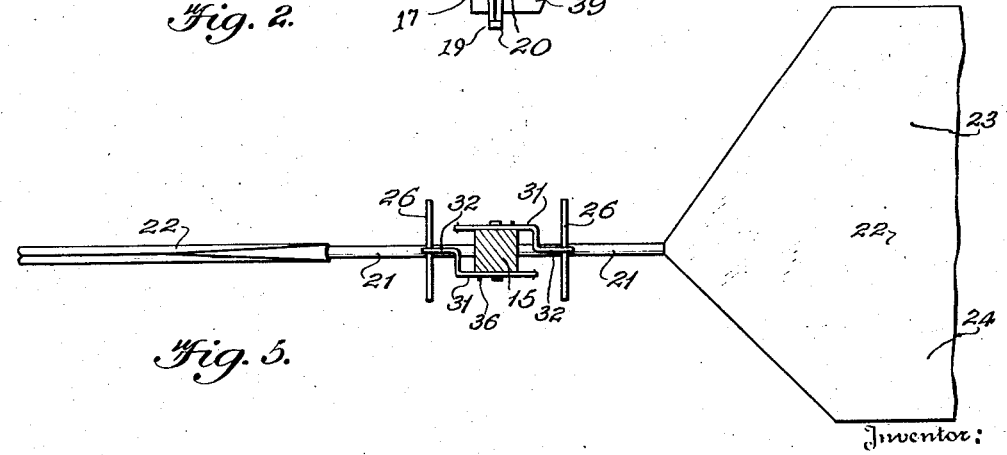
Figure 5 is a fragmentary horizontal section showing the triggers.

In operation, the lever 35 being released from catch 42 later described, the stop ends 32 fall, and if the short space between the arms 27—28 is not thereunder, the guard 29 will support the stop lever with the stop resting slidably on the guard. As soon as the vane moves to bring either of the arms 27—28 past the stop 32, the latter will fall into position, so that when the wind blows against the vane 22 the latter will be supported against turning by engagement of the arm 27 against the stop 32. When the vane has moved beyond a vertical plane coincident with the direction of the wind, the wind pressure against the back of the wide portion of the vane will swing the wide portion of the vane upward to the feathering position shown at the right in Figures 1 and 2. Arm 28 will thereby be moved against the stop 32 to check the vane in proper feathering and trailing position. As the vane now moves forwardly against the wind it will present a minimum cross sectional area to oppose the wind, and will so remain until after it has reached a plane nearly coincident with the direction of the wind. At this position the wind is incident to the end edge of the vane and exerts a pressure on the feather 39 by which the wide bottom of the vane is depressed and moved to position to receive the major impact and pressure of the air current. It is checked at this full operative position by engagement of the arm 27 against the stop 32, as before indicated. In case it is desired to stop the motor at any time, the lever 35 is depressed until held by the catch 42 which may be located on the shaft 15. At those vanes where feathering is occurring the pressure and friction of the arms 27 against the stops 32 will have been relieved and the levers 31 will be moved to inoperative position. Where the vane is sustaining wind pressure, however, the friction of the arm 28 against the stop 32 will prevent the movement of the latter upward, and so the respective springs 34 will yield, without moving the lever 31 and the lever may be secured in release position.

Figure 4:
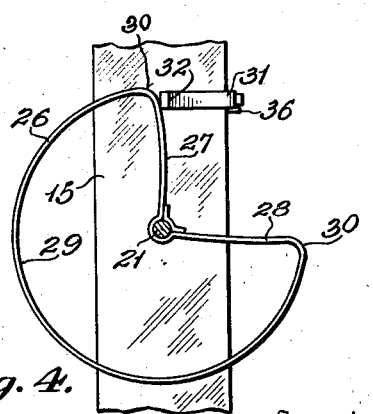
Figure 4 is a similar view showing the device at the beginning of automatic release action.

When the rotor has moved further, and pressure on the unreleased vane is relieved, the spring itself will then function by its contraction, to move the particular lever 31 to release position. The stops 32 engage the arms 28 near the outer ends of the latter and immediately at the beginning of the backwardly curved part 30. When the wind pressures upon the vanes reach an excessive degree endangering the integrity of the structure, the pressure of the arm 27 against the stop 32, in each instance, will cause the arm to become flexed backwardly, yielding to the stop 32, as shown by Fig. 4. The arm has its radius thus shortened, and the curved part of the spring begins to move under the stop 32. After a short movement of this kind the deflecting action of the curved part 30 acting upwardly after the manner of a cam, on the long arm of the lever, finally lifts this arm and moves the stop 32 above stop position and it remains resting upon the sector 29, which then moves under the stop 32 permitting the vane to lie free in feathering position. At all times, however, before such automatic release occurs, the device 26 acts to resiliently cushion shocks transmitted to or through the vanes by sudden gusts of wind, and will thereby minimize racking and deterioration of the structural parts.

Various modifications of the structure involving the invention may be made within the scope of the appended claims without departing from the spirit thereof, as discretion dictates.

I claim:—

1. In a motor of the character described, a rotor having vanes pivoted for movement to and from operative position on respective axes spaced from the medial lines of the vanes, so that each vane constitutes one wide portion and one narrow portion at respective sides of the axis, a control device including a coaxial shaft fixed with each vane, radial arms on the shaft at an angle of ninety degrees to each other, and a stop having a normal position between the two arms within said angle to engage one in the direction of its rotation under wind pressure on the wide portion, and to engage the other arm when the wide portion is at trailing position, and means to move the stop to inoperative position.

2. The structure of claim 1 in which at least said one arm is resilient, and adapted to yield to the stop and flex to pass the stop, under action of excessive wind pressures on the vane.

3. The structure of claim 1 in which the ends of the two arms are connected by an integral resilient sector, the junctions of the arms and sector being curved away from the stop engaging sides of the arm, and said stop is positioned to engage the arms closely adjacent the curved part whereby the stops will be moved toward inoperative position by a cam action when the arms are flexed sufficiently by pressure against the stop.

4. The structure of claim 1 in which the ends of the two arms are connected opposite said angle of 90 degrees by a sector concentric with the shaft, said sector being in a plane intersected by said stop.

5. In a fluid current motor, a rotatable support, a fluid current operated vane pivoted unsymmetrically thereon and yieldable to incident fluid, movable on its pivot to operative and inoperative positions transverse to and alined with incident fluid alternately, and manually releasable means to support the vane in operative position, said means being yieldable toward release position to a predetermined fluid current pressure on the vane.

6. The structure of claim 1 in which the stop is movable outwardly from said one arm, and said one arm is resilient and flexible to predetermined pressure of the stop thereagainst and movable to an inclined position at such angle to the path of movement of the stop that the stop will be moved outwardly and the arm will pass the stop, under excessive wind pressure on the vane.

ORVIS K. NELSON.